(12) United States Patent
Dick

(10) Patent No.: US 7,539,241 B1
(45) Date of Patent: May 26, 2009

(54) PACKET DETECTOR FOR A COMMUNICATION SYSTEM

(75) Inventor: Christopher H. Dick, San Jose, CA (US)

(73) Assignee: XILINX, Inc., San Jose, CA (US)

( * ) Notice: Subject to any disclaimer, the term of this patent is extended or adjusted under 35 U.S.C. 154(b) by 818 days.

(21) Appl. No.: 10/972,121

(22) Filed: Oct. 22, 2004

(51) Int. Cl.
*H04B 1/00* (2006.01)
*H04L 7/00* (2006.01)

(52) U.S. Cl. .................... 375/152; 375/150; 375/354; 375/355

(58) Field of Classification Search ......... 375/229–236, 375/150, 152, 142, 134, 245, 355, 354, 364
See application file for complete search history.

(56) References Cited

U.S. PATENT DOCUMENTS

| | | | |
|---|---|---|---|
| 5,914,616 A | 6/1999 | Young et al. | |
| 6,385,259 B1 * | 5/2002 | Sung et al. | 375/343 |
| 7,286,617 B2 * | 10/2007 | Vanderperren et al. | 375/343 |
| 7,406,102 B2 * | 7/2008 | Boesel et al. | 370/505 |
| 7,415,080 B2 * | 8/2008 | Echavarri et al. | 375/343 |
| 2004/0052319 A1 * | 3/2004 | Wakamatsu | 375/343 |
| 2004/0071104 A1 * | 4/2004 | Boesel et al. | 370/320 |
| 2005/0152317 A1 * | 7/2005 | Awater et al. | 370/338 |

OTHER PUBLICATIONS

Xilinx, Inc., "The Programmable Logic Data Book 2000," pp. 3-75 to 3-96, available from Xilinx, Inc., 2100 Logic Drive, San Jose, California 95124.

Xilinx, Inc., "Virtex-II Pro Platform FPGA Handbook," Oct. 2002, pp. 19 to 71, available from Xilinx, Inc., 2100 Logic Drive, San Jose, California 95124.

Xilinx, Inc., "Virtex-II Platform FPGA Handbook," Dec. 2000, pp. 33-75, available from Xilinx, Inc., 2100 Logic Drive, San Jose, California 95124.

Chris Dick et al., "FPGA implementation of an OFDM PHY", Signals, Systems and Computers, 2003, Conference Record of the Thirty-Seventh Asilomar Conference, Nov. 9-12, 2003, pp. 905-909 vol. 1, available from Xilinx, Inc., 2100 Logic Drive, San Jose, CA 95124.

U.S. Appl. No. 12/037,037 filed Feb. 25, 2008, Rao, R., et al., Xilinx, Inc. 2100 Logic Drive, San Jose, California 95124.

Heiskala, J. and Terry, J., OFDM Wireless LANS: A Theoretical and Practical Guide, Sam Publishing, 2002, Chapter 1, Background and WLAN Overview, pp. 1-46.

(Continued)

*Primary Examiner*—David C Payne
*Assistant Examiner*—Linda Wong
(74) *Attorney, Agent, or Firm*—W. Eric Webostad; Justin Liu

(57) ABSTRACT

Method and apparatus for packet detection is described. More particularly, a signal having sub-signals is received. The signal is quantized ("re-quantized") to provide a quantized signal to processing units, where the quantized signal is a sequence of samples. A cross-correlation is done between the sequence of samples and a reference template, including totaling partial results from the processing units to provide a result. The result is a symbol timing synchronization responsive to the cross-correlation, which is provided in part by combining by addition or subtraction a regression vector obtained from the sequence of samples and a coefficient term vector obtained from the reference template.

25 Claims, 5 Drawing Sheets

OTHER PUBLICATIONS

Schmidl, T.M. and Cox, D.C., "ow-Overhead, Low Complexity [Burst] synchronization of OFDM," IEEE International Conference on Communications, vol. 3, pp. 1301-1306, 1996.

Hu, Ye Hen, "CORDIC-Based VLSI Architectures for Digital Signal Processing", IEEE Signal Processing Magazine, pp. 16-35, Jul. 1992.

Xilinx, Inc. Systems Generator for DSP, http//www.xilinx.com/ise/optional_prod/systems_generator.htm website dated Dec. 18, 2008, 1 page.

The Mathworks, Inc. Using Simulink, 2002 http://www.mathworks.com/products/simulink/ website dated Dec. 18, 2008, 2 pages.

* cited by examiner

PACKET DETECTOR FOR A COMMUNICATION SYSTEM

FIELD OF THE INVENTION

One or more aspects of the invention relate generally to packet detection and more particularly, to packet detection for a communication system based on Orthogonal Frequency Division Multiplexing (OFDM).

BACKGROUND OF THE INVENTION

Orthogonal Frequency Division Multiplexing (OFDM) is widely used and is useful where communication channels exhibit severe multi-path interference. OFDM divides a signal waveform into orthogonal signals ("subcarriers") sending multiple symbols in parallel. In order to promote industry standardization, communication protocols may include Medium Access Control (MAC) and Physical Layer (PHY) specifications for OFDM communication system components. For example, in an Institute for Electronic and Electrical Engineers (IEEE) wireless local area network (WLAN) specification (e.g., IEEE 802.11a), OFDM hardware specifications are promoted for compliance with the WLAN specification. Notably, though an IEEE 802.11a specification is used hereafter, it should be appreciated that other communication protocols or standards may be used.

Signal computation requirements of an OFDM communication system, such as arithmetic calculations in particular, may be very demanding. By way of example, WLAN compliant with IEEE 802.11a has arithmetic calculations in the billions operations per second. This is beyond the capacity of conventional Digital Signal Processors (DSPs). However, circuitry to support billions of operations per second for OFDM communication can be expensive.

Accordingly, it would be desirable and useful to provide a packet detector for an OFDM communication systems that employs less circuitry than previously used.

SUMMARY OF THE INVENTION

An aspect of the invention is a method for packet detection, including: receiving a signal having sub-signals; quantizing the signal to provide a quantized signal to processing units, where the quantized signal is a sequence of samples; and cross-correlating as between the sequence of samples and a reference template including totaling partial results from the processing units to provide a result, where the result is a symbol timing synchronization responsive to the cross-correlation. The cross-correlation provided in part by combining by addition or subtraction a regression vector obtained from the sequence of samples and a coefficient term vector obtained from the reference template.

Another aspect of the invention is a method for packet detection, including: receiving an Orthogonal Frequency Division Multiplexed ("OFDM") signal having orthogonal sub-signals; quantizing the OFDM signal to provide a quantized signal, where the quantized signal is a sequence of samples; obtaining a cross-correlation result as between the sequence of samples and a reference template in part by: dividing the sequence of samples of correlation length L into respective portions of sub-correlation length N for L and N integers greater than zero; combining by respectively adding or subtracting each sample within each of the portions of the sequence of samples with a respective coefficient obtained from the reference template to provide interim partial cross-correlation results; and cumulating the interim partial cross-correlation results to provide a partial cross-correlation result.

Yet another aspect of the invention is a cross-correlator for a packet detector, including: a re-quantizer coupled to receive an input, where the input is an Orthogonal Frequency Division Multiplexed ("OFDM") signal having orthogonal sub-signals for providing symbols in parallel; sub-correlators coupled to the re-quantizer to obtain a sequence of samples responsive to the input, where the sub-correlators include: an address sequencer configured to provide a sequence of vector addresses and an associated sequence of coefficient addresses; vector storage coupled to receive the sequence of samples and to store at least a portion of the sequence of samples, where the vector storage is coupled to receive a vector address of the sequence of vector addresses and configured to provide a digital vector associated with a sample of the portion of the sequence of samples stored in the vector storage and located at the vector address received; coefficient storage coupled to receive a coefficient address of the sequence of coefficient addresses and configured to provide a digital coefficient responsive to the coefficient address received, where the coefficient storage is configured to store at least a portion of a preamble of a packet; an adder/subtractor coupled to receive the digital vector and the digital coefficient; a cumulator coupled to the adder/subtractor and configured to accumulate or de-cumulate output obtained from the adder/subtractor to provide an interim digital partial cross-correlation; and the adder/subtractor is coupled to receive the interim digital partial cross-correlation from the cumulator and configured to add or subtract the digital coefficient, the digital vector, and interim digital partial cross-correlation.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Figure 1:
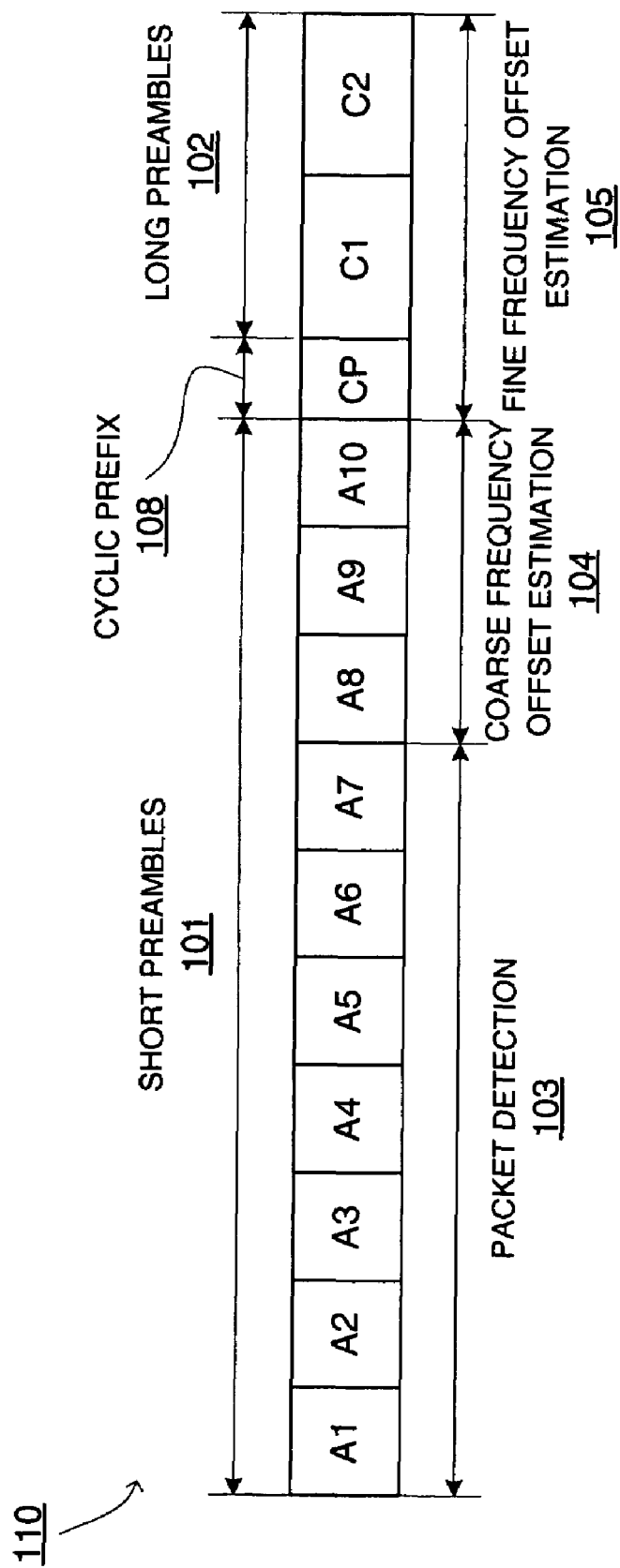
FIG. 1 is a block diagram depicting an exemplary embodiment of IEEE 802.11a compliant OFDM data packet preambles.

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output (I/O) resources by an interconnect switch matrix. Each function block of the CPLD includes a two-level or structure similar to those used in Programmable Logic Arrays (PLAs) and Programmable Array Logic (PAL) devices. In some CPLDs, configuration data is stored on-chip in non-volatile memory. In other CPLDs, configuration data is stored on-chip in non-volatile memory, then downloaded to volatile memory as part of an initial configuration sequence.

For all of these programmable logic devices (PLDs), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable.

OFDM

Prior to obtaining an estimation for channel equalization and for channel demodulation, an OFDM symbol timing estimation is obtained. Acquiring symbol timing estimations is different in broadcast and packet switched networks. For purposes of clarity by way of example, it will be assumed that a random access packet switch system, such as that used in IEEE 802.11a compliant networks, is used. However, it should be appreciated that other types of networks employing OFDM may be used. Conventionally, a receiver does not initially know where a packet starts, and thus an initial synchronization task is packet detection.

In WLAN systems, an agreed upon preamble is locally stored or otherwise accessible by a receiver. This allows use of a simple cross-correlation algorithm for acquiring symbol timing. After a packet detector has provided an estimate of the starting time for an OFDM transmission, the symbol timing can be resolved to sample-level precisions by cross-correlating between the received preamble sequence and the locally stored preamble. After a packet has been detected, other remaining synchronization tasks include carrier recovery, and coarse and fine timing recovery.

FIG. 1 is a block diagram depicting an exemplary embodiment of OFDM preambles 110. Though IEEE 802.11a compliant OFDM preambles 110 ("preambles 110") are illustratively shown, it should be understood that other OFDM protocols/specifications may be used. Preambles 110 includes short preambles 101, long preambles 102 and a cyclic prefix ("CP") 108. Notably, though an example of IEEE 802.11a compliant preambles are used below for purposes of clarity by way of example, it should be understood that other OFDM protocols/specifications may be used.

Short preambles 101 have ten short preambles A1 through A10, and long preambles 102 have two long preambles C1 and C2. Each short preamble A1 through A10 includes 16 digital samples which are all the same, and thus short preambles A1 through A10 each have the same sequence of digital samples. Each long preamble C1 and C2 includes 64 digital samples which are all the same, and thus long preambles C1 and C2 each have the same sequence of digital samples. Notably, though 16 digital samples and 64 digital samples are described for purposes of clarity by way of example, it should be understood that other numbers of digital samples for short or long or both preambles may be used.

CP 108 is an exact replica of the last 16 samples of the OFDM symbol currently scheduled for transmission, such as preamble C1 of long preambles 102. Thus, continuing the above example of an IEEE 802.11a compliant CP, CP 108 could have a length of 16 digital samples, namely, a 16 digital sample sequence.

It should be understood that initially a transmitter will send preamble information without data at the initiation of establishing a communications link. Once such communications link is established, data packets each with a CP may be sent. Preambles 110 are illustratively shown as information set for establishing a communication link.

Preambles 110 may be a part of an OFDM data packet. Short preambles A1 through A7 are used for packet detection, automatic gain control and diversity selection. Short preambles A8 through A10 are used for coarse frequency offset estimation. Long preambles C1 and C2 and cyclic prefix CP are used for channel estimation and fine frequency offset estimation. Additionally, preambles 110 are used for fine symbol timing estimation and channel estimation. Preambles A1 through A7 of short preambles 101 are used for an OFDM packet detection phase 103. Preambles A8 through A10 of short preambles 101 are used for a coarse frequency offset estimation phase 104. Long preambles C1, C2 and cyclic prefix CP are used for a fine frequency offset estimation phase 105.

An OFDM signal includes N orthogonal subcarriers modulated by N parallel data streams with a frequency spacing 1/T, where T is symbol duration. When subcarrier frequencies $f_k=k/(NT)$, for $f_k$ the k-th frequency, are equally spaced, there exists a single baseband OFDM symbol without a CP that could be considered to be the aggregated of the N modulated subcarriers. For a data packet, a CP is pre-appended to the data packet prior to serializing the data into a data sequence.

An OFDM data packet ("data packet") may include 64 subcarriers, from which 52 may be used to transmit data. Four of twelve non-data sub-carriers may be used to transmit pilot tones containing verification data. In such an implementation, each OFDM symbol can have a length of 64 digital samples, or $N_D=64$.

An OFDM transmitter digitally generates each m-th OFDM symbol, including N modulated subcarriers, while modulating each OFDM symbol by n digital samples using the Inverse Fast Fourier Transform ("IFFT"). Consequently, at an OFDM receiver, which includes an OFDM packet detector, the OFDM signal may be demodulated using a Fast Fourier Transform ("FFT") over a time interval [0,NT]. Transmitted OFDM signal r(n) is propagated through a given transmission channel with a transmission function h(n), and after FFT demodulation at the OFDM receiver the OFDM signal at an l-th subcarrier frequency is given by:

$$r(n) = s(n) * h(n) = \frac{1}{\sqrt{N}} \sum_{k=0}^{N-1} H_l x_{m,l} e^{j2\pi \frac{ln}{N}}, \text{ for } 0 < l < N-1, \quad (1)$$

where $H_l$ is the Fourier transform of h(t) evaluated at frequency $f_l$.

Figure 2:
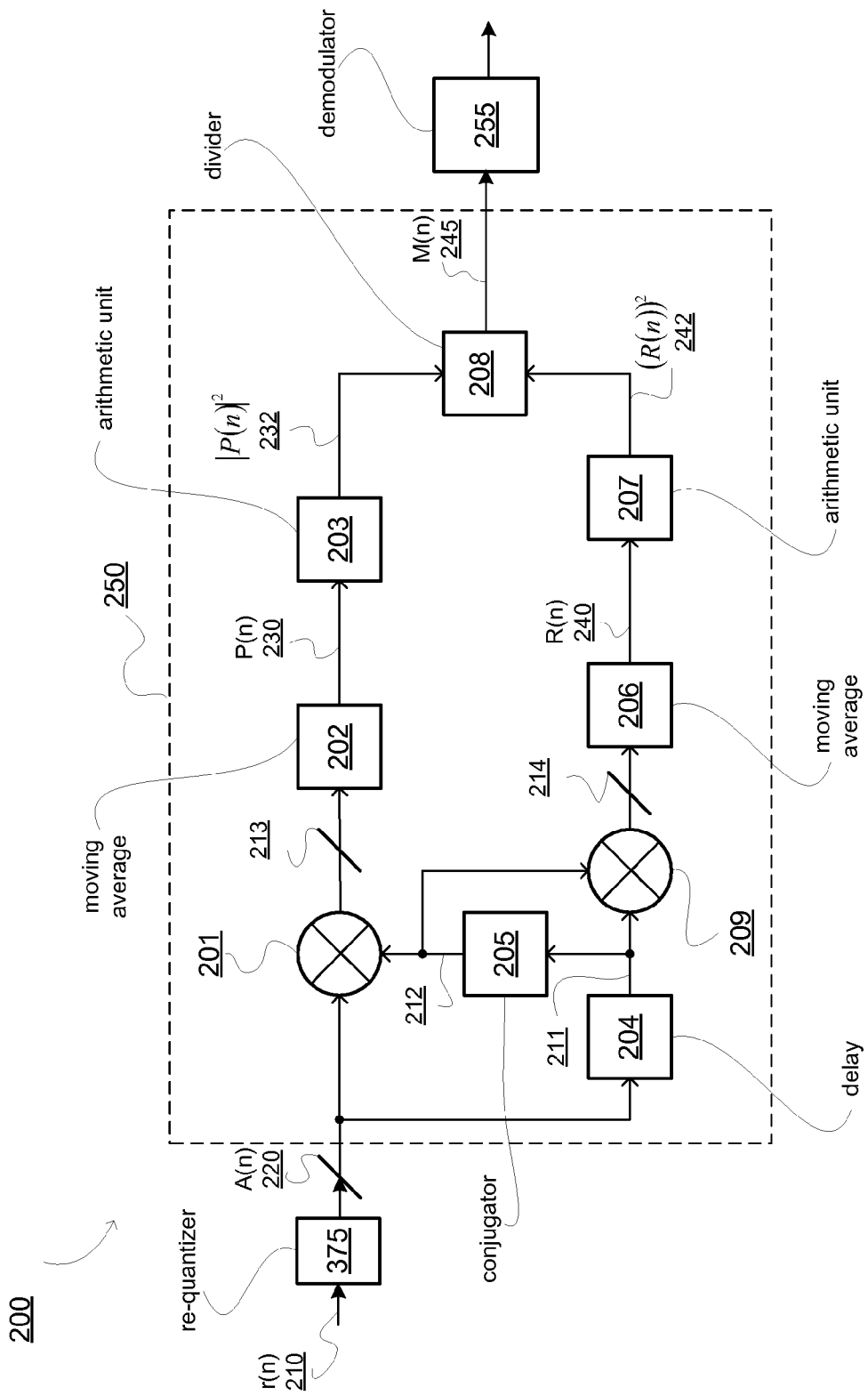
FIG. 2 is a block diagram depicting an exemplary embodiment of an OFDM packet detector with a sliding window short-preamble correlator.

FIG. 2 is a block diagram depicting an exemplary embodiment of an OFDM packet detector 200 with a sliding window short-preamble packet detector 250. With continuing reference to FIG. 2 and renewed reference to FIG. 1, OFDM packet detector 200 is further described. Notably, as used herein below, the term "signal" and "sequence" herein refer both to the singular form of a signal and to multiple signals provided in parallel.

Sliding window short-preamble packet detector 250 ("packet detector 250") provides OFDM symbol timing synchronization estimation, signal frequency offset estimation, and transmission channel estimation using a stored template of an IEEE 802.11a short preamble by applying a known Schmidl and Cox Sliding-Window Correlator ("SWC") algorithm. Frequency and timing synchronization is achieved by searching for a training pattern with a chosen length of M digital samples, such as A1 to A10 of short preamble 101 that has two identical halves of length L=M/2. The sum of L consecutive correlations between pairs of digital samples spaced L time periods apart may be found as:

$$C(n) = \sum_{m=0}^{L-1} r^*_{n+m} r_{n+m+L}. \quad (2)$$

An input OFDM signal r(n) 210 received from the transmission channel is provided to re-quantizer 375 which provides a digital sequence A(n) 220 for packet detector 250. Accordingly, high precision samples from r(n) 210 are provided to re-quantizer 375 and low precision samples, e.g., 2-bit samples, are provided from re-quantizer 375 as digital sequence A(n) 220. Digital sequence A(n) 220 contains an array of N digital samples of width B1, where B1 is an integer larger than or equal to one. Notably, sequence A(n) 220 has a width B1, and sequences 213 and 214 have widths B2, where B2 may be equal to B1. For example, both widths B1 and B2 may each be equal to 16 bits.

Digital sequence A(n) 220 is provided to packet detector 200 for OFDM symbol timing synchronization. Packet detector may be thought to have two correlators, namely, one correlator formed of multiplier 201 and moving average circuit 202 and another correlator formed of multiplier 209 and moving average circuit 206. Notably, moving average circuits 202 and 206 may be though of as sliding window averagers and may be implemented with filters.

Input digital sequence A(n) 220 of width B1 is provided to a multiplier 201 and to a delay element 204 as input. Delay element 204 provides output sequence 211, which is delayed relative to sequence A(n) 220 by a time interval D. Continuing the above example, time interval D is equal to the length Ns equal to 16 of one symbol of short preamble 101. Delayed sequence 211 is provided to a conjugator 205 and to a multiplier 209 as input. Conjugator 205 changes the sign of "imaginary" part of a complex number representing an input signal thereto. For example, a complex number R=A+iB becomes a conjugated number R*=A–iB and vice versa, where A an B respectively are "real" and "imaginary" parts of complex number R and of conjugated complex number R*. Output of conjugator 205 is input to digital multipliers 201 and 209.

Multiplier 201 multiplies sequence A(n) 220 with a delayed version thereof with imaginary numbers changed in sign, namely, sequence 212, to output sequence 213. Moving average circuit 202 determines a moving average of sequence 213 to provide signal P(n) 230. Cross-correlation signal P(n) 230 is a result of cross-correlation between sequence A(n) 220 and a delayed and conjugated version of sequence A(n) 220. In the example above, the delay is by one short preamble interval. Signal P(n) 230, which is a cross-correlation signal, may be mathematically expressed as:

$$a. P(n) = \sum_{m=0}^{L-1} r_{n+m} r^*_{n+m+D}. \quad (3)$$

Thus, the cross correlator formed of multiplier 201 and moving average circuit 202 provides cross-correlation at a lag responsive to delay introduced by delay unit 204. For example, the cross correlator formed of multiplier 201 and moving average circuit 202 performs a cross correlation of lag 16 samples.

Multiplier 209 multiplies a delayed sequence A(n) 220, namely, sequence 211, with a delayed version thereof with imaginary numbers changed in sign, namely, sequence 212, to provide sequence 214. Moving average circuit 206 determines a moving average for sequence 214 to provide signal R(n) 240.

Thus, the cross correlator formed of multiplier 209 and moving average circuit 206 performs a cross correlation at a lag of zero samples, as both of sequences 211 and 212 are delayed by delay unit 204. Continuing the above example, this delay may be a short preamble interval D. Recall that sequence 212 is a conjugated version of sequence 211. In other words, multiplier 209 effectively squares input signal 211 to provide a power thereof, which result is output sequence signal 214.

As a result of cross-correlation between signal 211 and conjugated signal 212, both of which are delayed by short preamble interval D, signal R(n) 240 is provided. Signal R(n) 240 is used to determine the energy of signal r(n) 210 received by packet detector 250 within cross-correlation time interval D. Signal R(n) 240, which is an autocorrelation signal, may be mathematically expressed as:

$$R(n) = \sum_{m=0}^{L-1} r_{n+m+D} r^*_{n+m+D}. \quad (4)$$

Notably, both cross correlations are autocorrelations, except with different lags. For example, a cross correlation to obtain R(n) 240 has a lag of zero, and a cross correlation to obtain P(n) 230 has a lag of 16. Notably, cross correlation as used herein is for the same sequence. In other words, two version of the same sequence are cross correlated with each other in each cross correlation. Thus, both cross correlations are autocorrelations with different lags.

Moving average circuit 202 provides signal P(n) 230 to an arithmetic unit 203 as input. Arithmetic unit 203 provides a mathematically squaring/absolute value arithmetic operation for the signal P(n) to become |P(n)|². Arithmetic unit 203 provides signal |P(n)|² 232 to a divider unit 208 as numerator input.

Moving average circuit 206 provides signal R(n) 240 to an arithmetic unit 207 as input. Arithmetic unit 207 provides a mathematically squaring operation for the signal R(n) to become (R(n))². Arithmetic unit 207 provides signal (R(n))² 242 to divider unit 208 as denominator input.

Divider 208 provides a division operation for signal |P(n)|² 232 over signal (R(n))² 242 to become a signal M(n) 245, or:

$$M(n) = \frac{|P(n)|^2}{(R(n))^2}. \quad (5)$$

Divider unit 208 provides signal M(n) 245 as output of packet detector 250 to a demodulator 255, such as for example an OFDM demodulator, for further processing.

Equations (3) and (4) may be computed iteratively. Notably, a Cascaded Integrator Comb ("CIC") filter may be instantiated in configurable logic of an FPGA, such as implemented for example in Xilinx Inc., Virtex-II Pro Platform FPGAs. A CIC filter may be used to implement Equations (3) and (4). Accordingly moving average circuits 202 and 206 may be CIC filters 202 and 206, respectively, implement in configurable logic of an FPGA. Alternatively, CIC filters may be implemented with dedicated circuitry.

For a delay equal to one short preamble symbol, such as a 16 sample delay, a shift register may be used, such as a shift register of length 16 for a 16 sample delay. For a signal path that is 16 parallel signal lines, 16 shift registers each providing 16 units of delay may be used. Shift register logic in Xilinx Inc., Virtex-II Pro Platform FPGAs, of 16-bit length may be used. Notably, for computing cross-correlations as in Equations (3) and (4), CIC filters 202 and 206 similarly use the same 16 sample delay in a differential section of each filter for computing P(n) and R(n).

Considering node precisions of the signal sequences of A(n), P(n) and R(n), and the fact that input signal 210 is complex valued, 2×D×B1+2×D×B2+2×D×B2 bits of storage are used for storage in this particular embodiment. For the precision D=B1=B2=16, this precision could be provided with 1536 slice flip-flops, or 768 FPGA logic slices to support the storage. If a shift register configuration of an FPGA Look Up Table ("LUT") is used, the number of slices may be reduced to 48, or a 6.25% area reduction as compared with the flip-flop based implementation described above.

Figure 3:
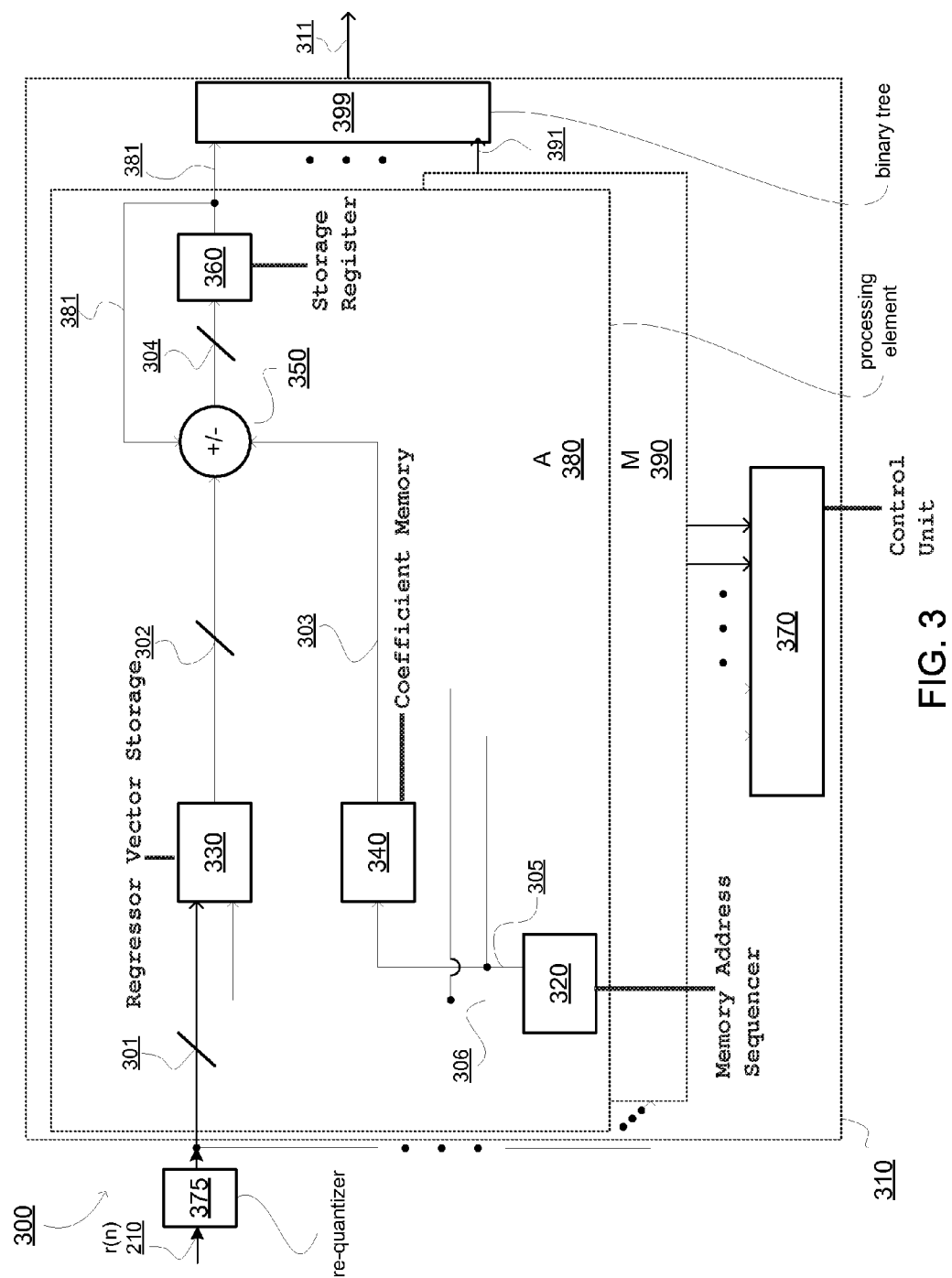
FIG. 3 is a block diagram depicting an exemplary embodiment of an OFDM packet detector with a sliding window long-preamble clipped cross-correlator.

FIG. 3 is a block diagram depicting an exemplary embodiment of an OFDM long preamble packet detector 300 with a sliding window long-preamble clipped cross-correlator 310. Sliding window long-preamble cross-correlator 310 ("correlator 310") is configured to provide symbol timing synchronization by calculating the cross-correlation between a received OFDM sequence, such as input signal 210, and a stored reference template, such as one of long preambles 102, such as a long preamble C1 for example. Long preamble C1 of long preambles 102 may be an IEEE 802.11a compliant preamble. With continuing reference to FIG. 3 and renewed reference to FIGS. 1 and 2, OFDM long preamble packet detector 300 is further described.

Correlator 310 employs a clipped cross-correlation algorithm by using a sign of input sequence 210 and a sign of locally stored long preamble sequence C1 of long preambles 102 to indicate a positive or negative value of input sequence r(n) 210. The clipped cross-correlation algorithm in this embodiment depicted by FIG. 3 does not require usage of any multipliers, including without limitation any FPGA instantiated or embedded multipliers.

In an implementation, OFDM long preamble packet detector 310 may operate the clipped cross-correlation algorithm for correlator at approximately 100 MHz clock rate to be at or near the same frequency as an FFT demodulation rate of OFDM packet detector 200 of FIG. 2, even though the frequency of input signal 210 may be at approximately 20 MHz. Though specific numerical examples are provided for purposes of clarity by way of example, it should be well understood that actual frequencies implemented may be close to these numerical examples or may substantially vary from these numerical examples.

Correlator 310 is configured with the clipped cross-correlation algorithm broken up into a number of shorter-length sub-correlations provided by a set of Processing Elements ("PE"), such as PE A 380 through M 390. Output of each PE is a partial result. The partial results of PEs are combined, such as by a binary tree 399, to form a result 311 for the algorithm.

Continuing the above example, long preamble C1 of long preambles 102 is a 64-sample sequences running at approximately a 20 MHz symbol rate. Each PE is responsible for computing one of five (e.g., 100/20=5) terms in what will be the final result. For one long preamble a total of thirteen (e.g., 64/5=13) PEs are in correlator 310. The above-described numerical example is for purposes of clarity by way of example; however, many other numerical examples and implementations follow from the example PE which implementations will depend at least in part on one or more of clock rate, symbol rate and template length.

For each PE, such as PE A 380, input samples from an OFDM signal r(n) 210 are re-quantized by re-quantizer 375 into 2-bit precision digital samples to provide a sequence of 2-bit samples 301 to correlator 310. In other words, high precisions samples enter re-quantizer 375 which is configured to provide low, e.g. 2-bit, precision samples. From each PE, such as PE A 380, 2-bit wide signal 301 is provided to regressor vector storage 330 as input.

Regressor vector storage 330 stores regressor vector information from signal 301 and provides five digital terms as a 2-bit wide regressor vector signal 302 responsive to an address. Signal 302 has a value and sign for each symbol term provided in a parallel 2-bit digital format to represent ±1. Notably, distributed memory of an FPGA may be used to store the sign of the five digital terms for each symbol in a long preamble received.

A memory address sequencer 320 generates a regressor vector address for regressor vector storage 330, which address is provided as address signal 306. Address signal 306 is provided to regressor vector storage 330 and a control unit 370 as input. Regressor vector storage 330 provides regressor vector signal 302 responsive to regressor vector address signal 306. Regressor vector signal 302 is provided to an addition-subtraction arithmetic unit ("adder/subtractor") 350 as input.

Memory address sequencer 320 generates a coefficient address for coefficient memory 340, which address is provided as address signal 305. Address signal 305 is provided to coefficient memory 340 and control unit 370 as input. Coefficient memory 340 may be used for locally storing coefficients or coefficient term vectors for cross-correlation. These coefficients are a long preamble, such as either C1 or C2.

In response to address signal 305, obtained from coefficient memory 340 is a coefficient term vector, which is provided as a 1-bit coefficient term signal 303 in this exemplary implementation. Adder/subtractor 350 performs a 1-bit precision addition or subtraction for two operands, namely, one operand is a 2-bit digital input sample from sequence 301 from regressor vector signal 302 and the other operand is the sign of a coefficient 303 from a reference template, such as long preamble C1 or C2, obtained from coefficient memory unit 340.

Continuing the example implementation, for approximately a 20 MHz data rate of the OFDM preamble, for every 50 ns interval, a five-term inner product is computed between the five 1-bit precision coefficients read from coefficient memory 340 and five 2-bit regressor vector terms obtained from regressor vector storage 330. Regressor vector storage 330 may be implemented with shift registers of slices of an FPGA, such as a 16-bit long shift register previously described. In an exemplary embodiment, a Shift Register Logic 16-bit length ("SRL16") configuration of a look-up table in an FPGA logic slice may be used to implement FPGA storage. Notably, two bits are used to represent ±1 using a two's complement representation. For a sample size of 16 and a look-up table that is 16 entries deep for storing 16 samples (i.e., delay is 16 samples), 16 SRL16s may be used.

To recap, received regression vector term are compared versus locally stored regression vector coefficients for an agreed upon preamble, which is long preamble C1 of long preambles 102 in this embodiment. By re-quantizing to obtain 2-bit samples, an adder/subtractor 350 provides a one bit multiplication function without using a multiplier by using signs of input operands. Sign from each term of the received OFDM symbol of either associated long preamble C1 or C2 of long preambles 102 relative to the locally stored coefficients in a PE may be used.

Adder/subtractor 350 provides a comparison of the received and stored regression vector information of long preamble 102, and provides in this implementation a 4-bit wide vector comparison signal 304 as output. Notably, precision correlation coefficients, which in this example are 1-bit precision, are effectively encoded in a control plane of a PE because they are directly coupled to an addition/subtraction control port of an accumulator or de-cummulator. For example, when signal 303 is a logic 0, the combination of adder/subtractor 350 and storage register 360 behaves as an accumulator. However, when signal 303 is a logic 1, adder/subtractor 350 is configured as a subtractor, and the combination of adder/subtractor 350 and storage register 360 behaves as a de-cummulator.

Digital signal 304 is provided to a delay unit 360 as input. Delay unit 360 may be implemented for example using a register for one unit of delay. Delay unit 360 delays discrete time domain signal 304 to provide a delayed time domain signal 381 as output. Delay unit 360 feeds back signal 381 to adder/subtractor 350 until full correction of every term of the portion of the regression vector handled by that PE is processed.

Delay unit 360 provides signal 381 as output of PE A 380. In the example, output of all thirteen PEs A 380 through M 390 as signals 381 through 391, respectively, are partial results which are combined by binary tree 399 to provide result signal 311.

Control unit 370 is configured to provide signaling for clearing registers. Control unit 370 may be implemented with a finite state machine (FSM) that clears register 360 at the start of a new integration interval. Continuing the above example, register 360 would be cleared every 5 clock cycles.

For a signaling rate of approximately 20 MHz, and recalling that the received signal and the long preamble are both complex valued time series, arithmetic operations rate to support the above-described numerical example of correlator 310 is approximately just over 5 millions of operations per second (MOPs), where a MOP is assumed to include all of the operation for computing one output sample, namely, data addressing and arithmetic processing (e.g., multiply-accumulate). However, by cross-correlating by using the sign of both the input sequence and the locally stored reference template, correlator 310 may be used to acquire symbol timing without using any embedded FPGA multipliers and thus saving resources. Correlator 310, as well as packet detector 300, of FIG. 3, may be instantiated in an FPGA shown below in FIGS. 4 and 5.

FPGA

Figure 4:
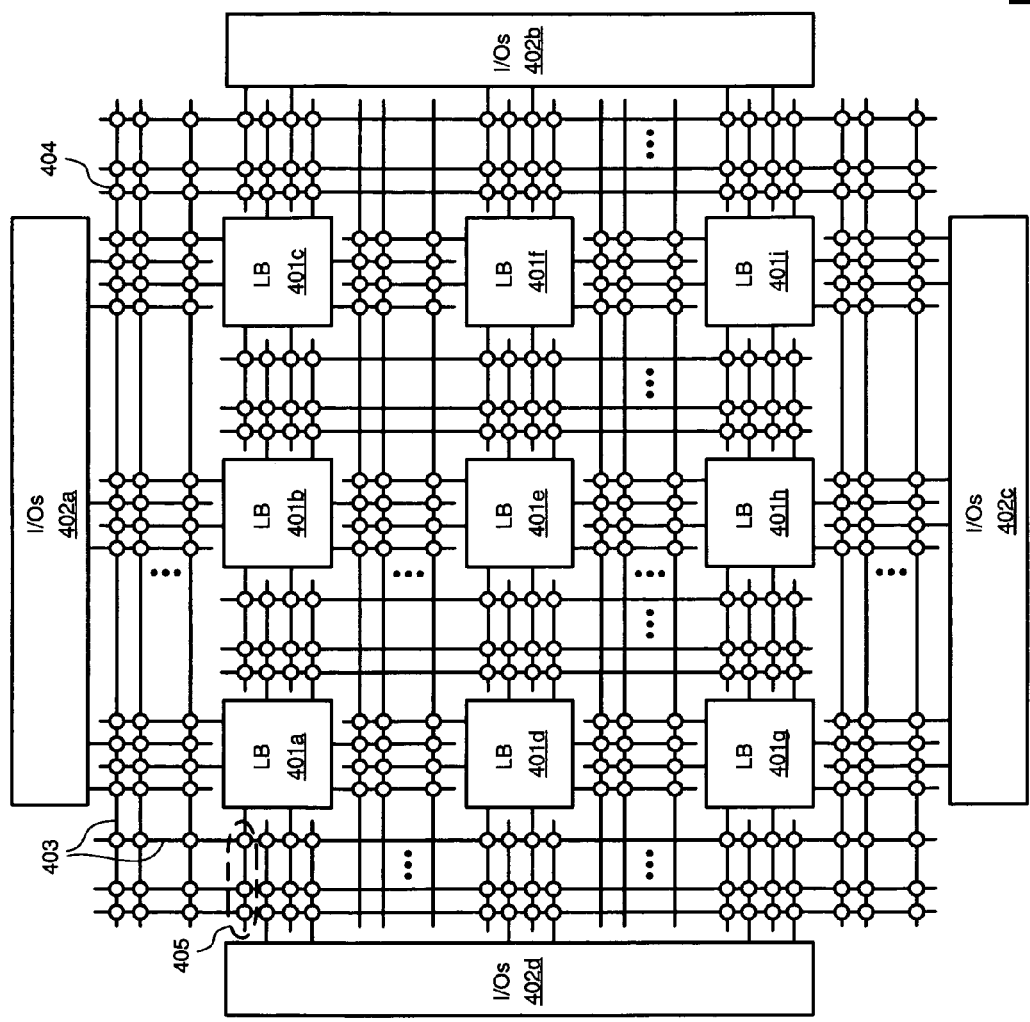
FIGS. 4 and 5 are simplified block diagrams depicting respective exemplary embodiments of prior art Field Programmable Gate Array architectures in which one or more aspects of the invention may be implemented.

FIG. 4 is a simplified illustration of an exemplary FPGA. The FPGA of FIG. 4 includes an array of configurable logic blocks (LBs 401a-401i) and programmable input/output blocks (I/Os 402a-402d). The LBs and I/O blocks are interconnected by a programmable interconnect structure that includes a large number of interconnect lines 403 interconnected by programmable interconnect points (PIPs 404, shown as small circles in FIG. 4). PIPs are often coupled into groups (e.g., group 405) that implement multiplexer circuits selecting one of several interconnect lines to provide a signal to a destination interconnect line or logic block. Some FPGAs also include additional logic blocks with special purposes (not shown), e.g., DLLs, RAM, and so forth.

One such FPGA, the Xilinx Virtex® FPGA, is described in detail in pages 3-75 through 3-96 of the Xilinx 2000 Data Book entitled "The Programmable Logic Data Book 2000" (hereinafter referred to as "the Xilinx Data Book"), published April, 2000, available from Xilinx, Inc., 2100 Logic Drive, San Jose, Calif. 95124, which pages are incorporated herein by reference. (Xilinx, Inc., owner of the copyright, has no objection to copying these and other pages referenced herein but otherwise reserves all copyright rights whatsoever.) Young et al. further describe the interconnect structure of the Virtex FPGA in U.S. Pat. No. 5,914,616, issued Jun. 22, 1999 and entitled "FPGA Repeatable Interconnect Structure with Hierarchical Interconnect Lines", which is incorporated herein by reference in its entirety.

One such FPGA, the Xilinx Virtex®-II FPGA, is described in detail in pages 33-75 of the "Virtex-II Platform FPGA Handbook", published December, 2000, available from Xilinx, Inc., 2100 Logic Drive, San Jose, Calif. 95124, which pages are incorporated herein by reference.

One such FPGA, the Xilinx Virtex-II Pro™ FPGA, is described in detail in pages 19-71 of the "Virtex-II Pro Platform FPGA Handbook", published Oct. 14, 2002 and available from Xilinx, Inc., 2100 Logic Drive, San Jose, Calif. 95124, which pages are incorporated herein by reference.

As FPGA designs increase in complexity, they reach a point at which the designer cannot deal with the entire design at the gate level. Where once a typical FPGA design comprised perhaps 5,000 gates, FPGA designs with over 100,000 gates are now common. To deal with this complexity, circuits are typically partitioned into smaller circuits that are more easily handled. Often, these smaller circuits are divided into yet smaller circuits, imposing on the design a multi-level hierarchy of logical blocks.

Libraries of predeveloped blocks of logic have been developed that can be included in an FPGA design. Such library modules include, for example, adders, multipliers, filters, and other arithmetic and DSP functions from which complex designs can be readily constructed. The use of predeveloped logic blocks permits faster design cycles, by eliminating the redesign of duplicated circuits. Further, such blocks are typically well tested, thereby making it easier to develop a reliable complex design.

Some FPGAs, such as the Virtex FGPA, can be programmed to incorporate blocks with pre-designed functionalities, i.e., "cores". A core can include a predetermined set of configuration bits that program the FPGA to perform one or more functions. Alternatively, a core can include source code or schematics that describe the logic and connectivity of a design. Typical cores can provide, but are not limited to, digital signal processing functions, memories, storage elements, and math functions. Some cores include an optimally floorplanned layout targeted to a specific family of FPGAs. Cores can also be parameterizable, i.e., allowing the user to enter parameters to activate or change certain core functionality.

Figure 5:
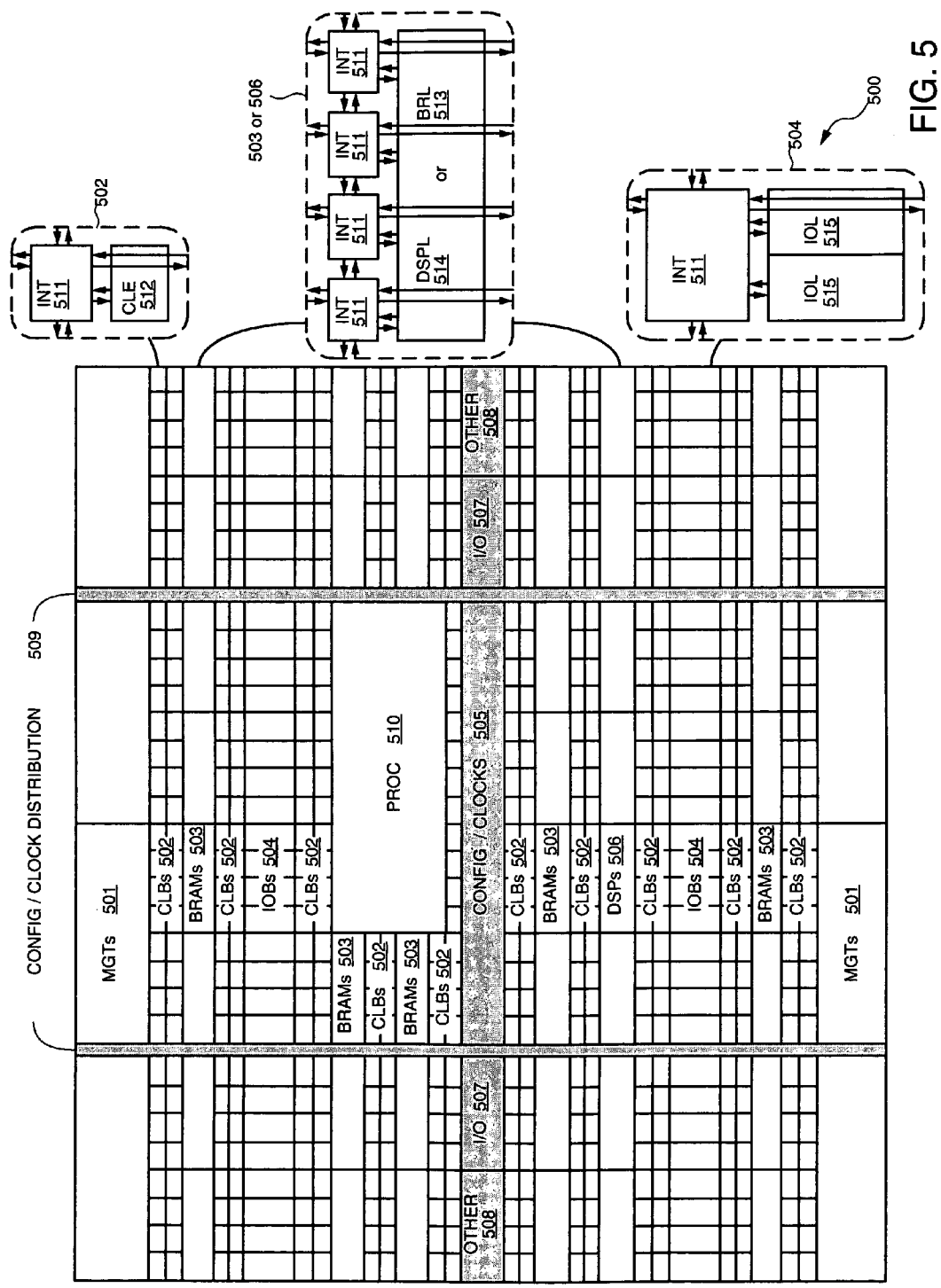

As noted above, advanced FPGAs can include several different types of programmable logic blocks in the array. For example, FIG. 5 illustrates an FPGA architecture 500 that includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507) (e.g., configuration ports and clock ports), and other programmable logic 508 such as digital clock managers, analog-to-digital converters, system monitoring logic, and so forth. Some FPGAs also include dedicated processor blocks (PROC 510).

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element (INT 511) also includes the connections to and from the programmable logic element within the same tile, as shown by the examples included at the top of FIG. 5.

For example, a CLB 502 can include a configurable logic element (CLE 512) that can be programmed to implement user logic plus a single programmable interconnect element (INT 511). A BRAM 503 can include a BRAM logic element (BRL 513) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 506 can include a DSP logic element (DSPL 514) in addition to an appropriate number of programmable interconnect elements. An IOB 504 can include, for example, two instances of an input/output logic element (IOL 515) in addition to one instance of the programmable interconnect element (INT 511). As will be clear to those of skill in the art, the actual I/O pads connected, for example, to the I/O logic element 515 are manufactured using metal layered above the various illustrated logic blocks, and typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic.

While the foregoing describes exemplary embodiment(s) in accordance with one or more aspects of the invention, other and further embodiment(s) in accordance with the one or more aspects of the invention may be devised without departing from the scope thereof, which is determined by the claim (s) that follow and equivalents thereof. Claim(s) listing steps do not imply any order of the steps. Trademarks are the property of their respective owners. Headings are merely used for organizational convenience, and in no way are intended to limit the scope of the disclosure thereunder.

What is claimed is:

1. A method for packet detection, comprising:
receiving, using a receiver, a signal having sub-signals;
quantizing the signal to provide a quantized signal to processing units, the quantized signal being a sequence of samples;
cross-correlating as between the sequence of samples and a reference template including totaling partial results from the processing units to provide a result, the result being a symbol timing synchronization responsive to the cross-correlation;
the cross-correlation provided in part by combining by addition or subtraction a regression vector obtained from the sequence of samples and a coefficient term vector obtained from the reference template; and
cumulating partial results from the combining of the regression vector and the coefficient term vector for all regression vectors and coefficient terms associated with a portion of the sequence of samples,
wherein the cumulating comprises:
accumulating a combination of the regression vector and the coefficient term vector responsive to a first logic value of the coefficient term vector; and
de-cumulating the combination of the regression vector and the coefficient term vector responsive to a second logic value of the coefficient term vector.

2. The method, according to claim 1, wherein the signal is an orthogonal frequency division multiplexed carrier signal.

3. The method, according to claim 2, wherein the sub-signals are subcarriers.

4. The method, according to claim 3, wherein the quantized signal is a sequence of 2-bit samples.

5. The method, according to claim 4, wherein the reference template is a long preamble.

6. The method, according to claim 5, where in the long preamble is defined by an IEEE 802.11 specification.

7. The method, according to claim 1, further comprising providing a cumulated partial total output from the regression vectors and the coefficient term vectors combined.

8. The method, according to claim 7, wherein the cumulated partial total output is a partial result of the partial results after all the regression vectors and the coefficient term vectors have been combined for the portion of the sequence of samples.

9. A method for packet detection, comprising:
receiving, using a receiver, an Orthogonal Frequency Division Multiplexed ("OFDM") signal having orthogonal sub-signals;
quantizing the OFDM signal to provide a quantized signal, the quantized signal being a sequence of samples;
obtaining a cross-correlation result as between the sequence of samples and a reference template in part by:
dividing the sequence of samples of correlation length L into respective portions of sub-correlation length N for L and N integers greater than zero;
combining by respectively adding or subtracting each sample within each of the portions of the sequence of samples with a respective coefficient obtained from the reference template to provide interim partial cross-correlation results;
cumulating the interim partial cross-correlation results to provide a partial cross-correlation result; and
aggregating the partial cross-correlation results to provide the cross-correlation result;
wherein the correlation length L is determined by length of the reference template;
wherein the cumulating comprises:
accumulating a combination of the interim partial cross-correlation results responsive to a first logic value of the respective coefficient and de-cumulating a combination of the interim partial cross-correlation results response to a second logic value of the respective coefficient.

10. The method, according to claim 9, wherein the sub-correlation length N is determined by a ratio of frequencies.

11. The method, according to claim 10, wherein the ratio of frequencies is a correlator frequency divided by a sub-correlator frequency.

12. A cross-correlator for a packet detector, comprising:
a re-quantizer coupled to receive an input, the input being an Orthogonal Frequency Division Multiplexed ("OFDM") signal having orthogonal sub-signals for providing symbols in parallel;
sub-correlators coupled to the re-quantizer to obtain a sequence of samples responsive to the input, the sub-correlators including:
an address sequencer configured to provide a sequence of vector addresses and an associated sequence of coefficient addresses;
vector storage coupled to receive the sequence of samples and to store at least a portion of the sequence of samples, the vector storage coupled to receive a vector address of the sequence of vector addresses, the vector storage configured to provide a digital vector associated with a sample of the portion of the sequence of samples stored in the vector storage and located at the vector address received;
coefficient storage coupled to receive a coefficient address of the sequence of coefficient addresses and configured to provide a digital coefficient responsive to the coefficient address received, the coefficient storage configured to store at least a portion of a preamble of a packet;
an adder/subtractor coupled to receive the digital vector and the digital coefficient;
a cumulator coupled to the adder/subtractor and configured to accumulate or de-cumulate output obtained from the adder/subtractor to provide an interim digital partial cross-correlation; and
the adder/subtractor coupled to receive the interim digital partial cross-correlation from the cumulator and configured to add or subtract the digital coefficient, the digital vector, and interim digital partial cross-correlation.

13. The cross-correlator, according to claim 12, wherein the cross-correlator is a sliding window long-preamble clipped cross-correlator.

14. The cross-correlator, according to claim 12, wherein the preamble is a long preamble of the packet.

15. The cross-correlator, according to claim 12, wherein the cross-correlator a frequency of operation for the sub-correlators and another frequency of operation external to the sub-correlators.

16. The cross-correlators, according to claim 15, wherein the frequency of operation divided by the other frequency of operation provides a computing term, wherein the preamble length divided by the computing term indicates number of the sub-correlators.

17. The cross-correlator, according to claim 16, further comprising a control unit coupled to receive the sequence of vector addresses and the sequence of coefficient addresses.

18. The cross-correlator, according to claim 17, wherein the control unit is a finite state machine.

19. The cross-correlator, according to claim 18, wherein the control unit is shared by all of the sub-correlators.

20. The cross-correlator, according to claim 13, further comprising a combining tree coupled to receive the interim digital partial cross-correlation from each of the sub-correlators to provide a cross-correlation to acquire symbol timing of the input.

21. The cross-correlator, according to claim 20, wherein the sub-correlators are programmed into configurable logic of a programmable logic device.

22. The cross-correlator, according to claim 21, wherein the programmable logic device is a Field Programmable Gate Array.

23. The cross-correlator, according to claim 21, wherein the vector storage and the coefficient storage are instantiated in the configurable logic with shift register logic.

24. The cross-correlator, according to claim 23, wherein the shift register logic is a look-up table in a Field Programmable Gate Array logic slice.

25. The cross-correlator, according to claim 12, wherein the sub-correlators do not include any multiplier.

* * * * *